US012793084B2

(12) United States Patent
Song et al.

(10) Patent No.: US 12,793,084 B2
(45) Date of Patent: Nov. 10, 2026

(54) CERTIFICATION SYSTEM AND METHOD FOR CARBON NEUTRALITY, DEVICE AND STORAGE MEDIUM

(71) Applicant: Sungrow Icarbon Technology Co., Ltd., Hefei (CN)

(72) Inventors: Shi Song, Hefei (CN); Jing Zhang, Hefei (CN)

(73) Assignee: Sungrow Icarbon Technology Co., Ltd., Hefei (CN)

(*) Notice: Subject to any disclaimer, the term of this patent is extended or adjusted under 35 U.S.C. 154(b) by 194 days.

(21) Appl. No.: 18/510,555

(22) Filed: Nov. 15, 2023

(65) Prior Publication Data

US 2024/0185262 A1 Jun. 6, 2024

(30) Foreign Application Priority Data

Dec. 1, 2022 (CN) ........................ 202211538944.5

(51) Int. Cl.
*G06Q 30/018* (2023.01)
*G06Q 10/0637* (2023.01)

(52) U.S. Cl.
CPC ..... *G06Q 30/018* (2013.01); *G06Q 10/06375* (2013.01)

(58) Field of Classification Search
CPC .......................................... G06Q 10/00–50/00
USPC ............................................... 705/7.11–7.42
See application file for complete search history.

(56) References Cited

U.S. PATENT DOCUMENTS 8,103,556 B2 * 1/2012 Robinson ............... G06Q 30/00 705/26.7
8,346,595 B2 * 1/2013 Ben-Hamida ...... G06Q 30/0283 705/400
9,665,907 B2 * 5/2017 Hamilton, II ...... G06Q 30/0283
11,328,361 B2 * 5/2022 Xie ........................ G06Q 40/06
(Continued)

FOREIGN PATENT DOCUMENTS

WO WO 2022/225446 A1 10/2022

OTHER PUBLICATIONS

EP23209163.7, Apr. 5, 2024, Extended European Search Report.
(Continued)

*Primary Examiner* — Alan S Miller
(74) *Attorney, Agent, or Firm* — Wolf, Greenfield & Sacks, P.C.

(57) ABSTRACT

A certification system and a certification system for carbon neutrality, a device and a storage medium are provided. In the system, a carbon emission determination module is configured to determine carbon emission data and activity information of a carbon neutral entity based on certification declaration information of the carbon neutral entity, a carbon offset module is configured to perform a residual carbon emission offset operation based on the carbon emission data of the carbon neutral entity and generate offset information, a certification module is configured to determine a certification result of the carbon neutral entity based on the certification declaration information, the carbon emission data, the activity information and the offset information in combination with a carbon neutral certification standard, and a database module is configured to store various types of data generated by the carbon neutral entity during carbon neutral certification to share the data.

12 Claims, 8 Drawing Sheets

(56) References Cited

U.S. PATENT DOCUMENTS

| | | | | |
|---|---|---|---|---|
| 11,880,894 | B2 * | 1/2024 | Campbell | G06Q 30/018 |
| 2007/0255457 | A1 * | 11/2007 | Whitcomb | G05B 15/02 700/273 |
| 2009/0157534 | A1 * | 6/2009 | Arsiwala | G06Q 40/12 705/37 |
| 2011/0208621 | A1 * | 8/2011 | Feierstein | G06Q 40/04 705/317 |
| 2015/0235315 | A1 * | 8/2015 | Margolis | G06Q 40/06 705/37 |
| 2024/0193684 | A1 * | 6/2024 | Bai | G06Q 20/123 |

OTHER PUBLICATIONS

First Examination Report for Australian Patent Application No. 2023258432, dated Oct. 30, 2024.
[No Author Listed], Climate Active Carbon Neutral Standard for Organisations. An Australian Government Initiative. Oct. 26, 2022:1-7.
AU2023258432, Oct. 30, 2024, First Examination Report.
Extended European Search Report for European Application No. 23209163.7, dated Apr. 5, 2024.
[No Author Listed], National Carbon Offset Standard for Buildings. Commonwealth of Australia. Sep. 30, 2017:p. 1-82. Retrieved from the Internet: http://apo.org.au/sites/default/files/resource-files/2017-09/apo-nid113756.pdf.

* cited by examiner

CERTIFICATION SYSTEM AND METHOD FOR CARBON NEUTRALITY, DEVICE AND STORAGE MEDIUM

The present disclosure claims priority to Chinese Patent Application No. 202211538944.5, titled "CERTIFICATION SYSTEM AND METHOD FOR CARBON NEUTRALITY, DEVICE AND STORAGE MEDIUM", filed on Dec. 1, 2022, with the China National Intellectual Property Administration, which is incorporated herein by reference in its entirety.

FIELD

The present disclosure relates to the technical field of carbon neutrality, and in particular to a certification system and a certification method for carbon neutrality, a device and a storage medium.

BACKGROUND

Dual carbon is an abbreviation of carbon peaking and carbon neutrality. The "dual carbon" strategy advocates a green, environmental-friendly and low-carbon lifestyle. Carbon neutrality means a balance between carbon dioxide or greenhouse gas emissions directly or indirectly generated by a country, an enterprise, a product, an activity or an individual within a certain period of time and carbon absorption from afforestation, energy conservation and emission reduction for the purpose of "zero emission". Moving towards carbon neutrality globally is a necessary path in the context of climate change and also an inevitable choice for sustainable development of the earth.

Carbon neutral certification aims to provide a description of carbon emissions and carbon neutrality journey for organizations, products, and activities. Carbon neutral certification may enhance an ability of low-carbon strategic planning and carbon management for enterprises, and is also beneficial for consumers to distinguish environmental protection products and services, for encouraging enterprises to save energy and reduce emissions, thereby achieving a virtuous circle. Carbon neutral certification involves carbon footprint management and planning, implementation of carbon reduction solution, carbon emission measurement, residual carbon offset, certification by third-party institutions and the like.

However, at present, the carbon neutral certification work is carried out independently in all business areas, and all links are not effectively combined. Data in the whole process of certification is not public, failing to achieve fine management and control. Moreover, coupling optimization of industrial chain and dual carbon life cycle is not fully considered, failing to form optimized carbon neutral certification. As a result, the efficiency of certification is low.

SUMMARY

A certification system for carbon neutrality and a certification method for carbon neutrality, a device and a storage medium are provided according to the present disclosure, so that data in the whole process of certification is shareable and public, thereby improving the efficiency of examination and success in certification.

In a first aspect, a certification system for carbon neutrality is provided according to an embodiment. The system includes a carbon emission determination module, a carbon offset module, a certification module and a database module.

The carbon emission determination module is configured to configured to determine carbon emission data and activity information of a carbon neutral entity based on certification declaration information of the carbon neutral entity.

The carbon offset module is configured to perform a residual carbon emission offset operation based on the carbon emission data of the carbon neutral entity and generate offset information.

The certification module is determine a certification result of the carbon neutral entity based on the certification declaration information, the carbon emission data, the activity information and the offset information in combination with a carbon neutral certification standard.

The database module is configured to store data generated by the carbon neutral entity during carbon neutral certification to share the data.

In a second aspect, a certification method for carbon neutrality is provided according to an embodiment, and is executed by the system in the first aspect. The method includes: determining the carbon emission data and the activity information of the carbon neutral entity based on the certification declaration information of the carbon neutral entity, by the carbon emission determination module; performing the residual carbon emission offset operation based on the carbon emission data of the carbon neutral entity and generating the offset information by the carbon offset module; determining the certification result of the carbon neutral entity based on the certification declaration information, the carbon emission data, the activity information and the offset information in combination with the carbon neutral certification standard, by the certification module; and storing the data generated by the carbon neutral entity during the carbon neutral certification to share the data, by the database module.

In a third aspect, an electronic device is further provided according to an embodiment of the present disclosure. The electronic device includes one or more processors, and a memory configured to store one or more programs. The one or more programs, when executed by the one or more processors, cause the one or more processors to perform the method in the second aspect.

In a fourth aspect, a storage medium including computer executable instructions is further provided according to an embodiment of the present disclosure. The computer executable instructions, when executed by a computer processor, implement the method in the second aspect.

A certification system and a certification method for carbon neutrality, a device and a storage medium are disclosed according to embodiments of the present disclosure. The system includes a carbon emission determination module, a carbon offset module, a certification module and a database module. The carbon emission determination module is configured to determine carbon emission data and activity information of a carbon neutral entity based on certification declaration information and carbon emission information of the carbon neutral entity. The carbon offset module is configured to perform a residual carbon emission offset operation based on the carbon emission data of the carbon neutral entity and generate offset information. The certification module is configured to determine a certification result of the carbon neutral entity based on the carbon emission information, the carbon emission data, the activity information and the offset information in combination with a carbon neutral certification standard. The database module is configured to store various types of data generated by the carbon neutral entity during carbon neutral certification to share the data. The above technical solution is different from the existing manual examination and certification method for carbon neutral certification. With the certification system for carbon neutrality, after receiving certification declaration information of the carbon neutral entity, carbon emission data and information data are determined by the carbon emission determination module and are provided to the carbon offset module. The carbon offset module performs the residual carbon offset operation based on the carbon emission data and sends offset information to the certification module. The certification module performs the carbon neutral verification based on the certification declaration information, the carbon emission data, activity information and the offset information, thus achieving the carbon neutral certification online. A database module is included according to the technical solution, so that data in the whole process of certification is sharable and public, which is convenient for a carbon neutral certification entity to acquire relevant information in the process of certification in time to optimize carbon footprint management and adjust carbon reduction solution, and convenient to improve the efficiency of examination and a pass rate of certification. On the basis of achieving one-stop carbon neutral automatic certification, a manual examination link is reduced, the efficiency of examination is improved, and an examination cost is reduced.

It should be understood that the summary is neither intended to identify keys or important features of the embodiments of the present disclosure nor to limit the scope of the present disclosure. Other features of the present disclosure are to be readily understandable through the following specification.

BRIEF DESCRIPTION OF THE DRAWINGS

In order to more clearly illustrate technical solutions in embodiments of the present disclosure, the drawings used in the description of the embodiments are briefly described below. It is apparent that the drawings in the following description show only some embodiments of the present disclosure, and other drawings may be obtained by those skilled in the art based on the drawings without any creative efforts.

DETAILED DESCRIPTION OF EMBODIMENTS

The technical solutions of embodiments in the present disclosure are described clearly and completely hereinafter with reference to the drawings for the embodiments of the present disclosure, so that those skilled in the art can better understand the solutions. It is apparent that the embodiments described are only some rather than all the embodiments of the present disclosure. Any other embodiments obtained based on the embodiments of the present disclosure by those skilled in the art without any creative effort fall within the scope of protection of the present disclosure.

It should be noted that the terms such as "target" and "original" in the specification, claims, and drawings of the present disclosure are intended to distinguish similar objects rather than describe a particular sequence or order. It should be understood that terms used in the above way may be exchanged in an appropriate case, such that the embodiments of the present disclosure described herein can be implemented in an order different from the order shown or described herein. In addition, terms of "include", "comprise" or any other variants thereof are intended to be non-exclusive. For example, a process, method, system, product or device including a series of steps or units includes not only the listed steps or units but also a step or unit not listed or inherent in the process, method, system, product or device.

At present, the carbon neutral certification work is carried out independently in all business areas, and all links are not effectively combined. Data in the whole process of certification is not public, failing to achieve fine management and control. Moreover, coupling optimization of industrial chain and dual carbon life cycle is not fully considered, resulting in failure to form optimized carbon neutral certification and consequently high cost. In addition, carbon neutral certification is mainly manual and based on personal experience of the user, and thus is repetitious, resulting in low efficiency, long cycle and insufficient risk management and control, and failure to adapt to large-scale promotion of dual carbon. Therefore, it is urgently to provide a certification system for carbon neutrality to solve the above problems.

First Embodiment

Figure 1:
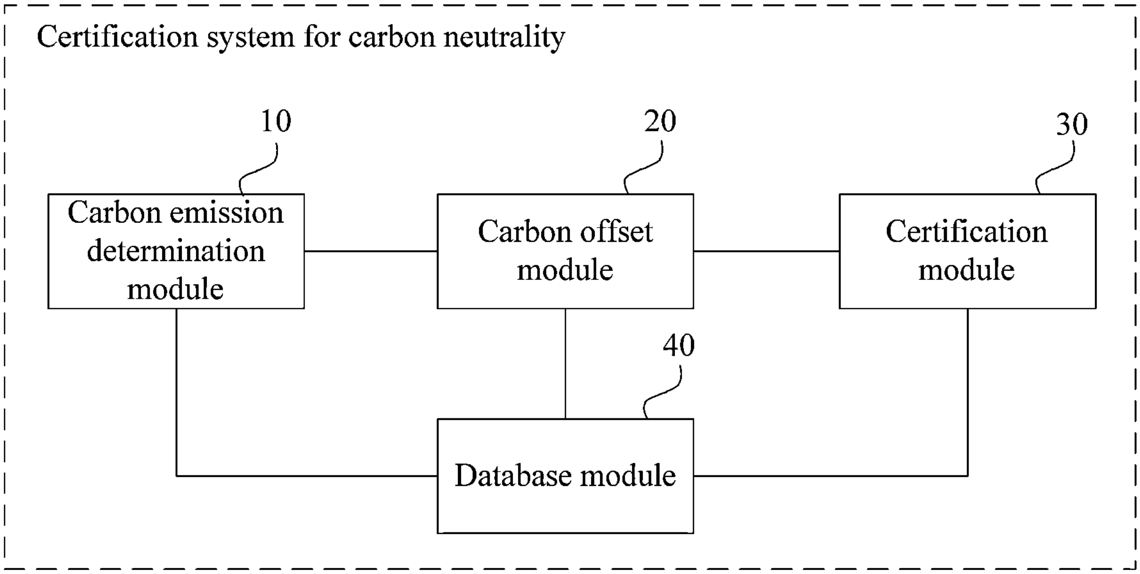
FIG. 1 is a schematic structural diagram illustrating a certification system for carbon neutrality according to a first embodiment of the present disclosure.

FIG. 1 is a schematic structural diagram of a certification system for carbon neutrality according to a first embodiment of the present disclosure. The embodiment is suitable for a case of carbon neutral certification. The system is implemented by hardware and/or software and is generally integrated in an electronic device.

A certification system for carbon neutrality is provided according to an embodiment of the present disclosure. As shown in FIG. 1, the system includes a carbon emission determination module 10, a carbon offset module 20, a certification module 30 and a database module 40. The carbon emission determination module 10 is configured to determine carbon emission data and activity information of a carbon neutral entity based on certification declaration information of the carbon neutral entity. The carbon offset module 20 is configured to perform a residual carbon emission offset operation based on the carbon emission data of the carbon neutral entity and generate offset information. The certification module 30 is configured to determine a certification result for the carbon neutral entity based on the certification declaration information, the carbon emission data, the activity information and the offset information in combination with carbon neutral certification standards. The database module 40 is configured to store various types of data generated by the carbon neutral entity during carbon neutral certification to share the data.

The carbon neutral certification work is applicable to all organizations, products and activities for which carbon neutral certification is necessary, which proves that all organizations, sites and activities each have a reliable carbon footprint, a promise to reduce emissions year-on-year, and emission reduction plans to fulfill their commitments, and the residual carbon footprint is offset with the verified carbon sink and/or carbon credits. Carbon neutral certification involves carbon footprint management and planning, implementation of carbon reduction solution, carbon emission measurement, residual carbon offset, certification by third-party institutions and the like. In an embodiment, based on a data flow and a business flow in each stage of the carbon neutral certification work, the carbon emission determination module 10, the carbon offset module 20, the certification module 30 and the database module forms the certification system for carbon neutrality, which is configured for one-stop online certification of carbon neutral certification. The carbon emission determination module is configured to determine the carbon emission data and the activity information of the carbon neutral entity based on the certification declaration information of the carbon neutral entity.

The carbon neutral entity may include all levels of governments, organizations and individuals dedicated to carry out carbon neutrality. In order to facilitate the description, in an embodiment, an enterprise is taken as an example of the carbon neutral entity, which is not limited to the enterprise. In a case that the carbon neutral entity requires carbon neutral certification, a carbon neutral certification process of the carbon neutral entity about this activity may be carried out through the certification system for carbon neutrality according to the embodiment. The carbon neutral system according to the embodiment provides a visual interface to achieve human-computer interaction between the carbon neutral entity and the system. In an embodiment, the certification system for carbon neutrality provides a visual interface for receiving a carbon neutral certification application of the carbon neutral entity. For example, the visual interface of the certification system for carbon neutrality may include controls such as a login button, a carbon neutral application button, an application cancellation button and an applied record. The carbon neutral entity logs into the certification system for carbon neutrality by inputting its own account and password, to perform operations related to carbon neutral certification.

In an embodiment, in order to carry out the carbon neutral certification, the carbon neutral entity applies for carbon neutral certification through the carbon neutral system and writes certification declaration information to the carbon neutral system. The certification declaration information may include a certification authority, a carbon neutral range, a time period, carbon emission information and the like. The carbon emission information at least includes an emission source type, emission source activity data and carbon reduction solution information. The carbon emission determination module 10 is configured to monitor a carbon neutral range and carbon emission for the carbon neutral entity in a certain time period. The carbon neutral entity may select or write a certification authority, determine a carbon neutral range, a time period, commitment and a plan, and a carbon reduction solution by reducing consumption in the carbon neutral system. After determining the carbon neutral range and the time period, the carbon neutral entity may write the carbon reduction solution and activity data in the system to a carbon neutral standard. Alternatively, the carbon reduction solution and activity data may be automatically collected by the system or collected and uploaded by the Internet of Things, and then relevant information is uploaded. The activity data may be understood as information used to prove the authenticity of carbon emission data, for example, an evidence used to prove the authenticity of carbon emission source activity data.

In an embodiment, an emission source and activity data for carbon neutrality are collected, including range 1, range 2 and range 3 specified in the carbon neutral standard. Range 1 refers to direct emissions, that is, direct greenhouse gas emissions from directly controlled fuel combustion activities and physical and chemical production processes. Range 2 refers to indirect emissions, that is, greenhouse gas emissions generated from outsourced energy, including electricity, heat, steam and cold air. Range 3 refers to indirect emissions of activities upstream and downstream of a value chain, that is, covering a wide range of activity types upstream and downstream. Data sources may come from the Internet of Things, application program interfaces, message queues, image recognition, video recognition and manual input. Carbon emission measurement is vital to carbon neutrality. In order to achieve carbon neutrality, it is necessary to know how much carbon is emitted, and then carbon absorption may be done based on the data. Based on carbon emission information, carbon emission data may be determined, and residual carbon emission offset is required to be perform based on the carbon emission data. The carbon emission determination module 10 determines carbon emission of the carbon neutral entity based on carbon emission data, and determines carbon emission data of the carbon neutral entity based on emission reduction solution.

In an embodiment, the carbon emission determination module 10 determines the carbon emission data and the activity information of a carbon neutral entity based on certification declaration information and carbon emission information of the carbon neutral entity, and outputs the carbon emission data and the activity information within a range and a time period determined in this carbon neutral certification to the carbon offset module 20 and the certification module 30, to provide data related to carbon neutrality for the carbon offset module 20 and the certification module 30.

The carbon offset module 20 is configured to perform a residual carbon emission offset operation based on the carbon emission data of the carbon neutral entity and generate offset information.

In an embodiment, after the carbon offset module 20 receives the carbon emission data provided by the carbon emission determination module 10 and the carbon neutral entity performs the emission reduction solution, the carbon offset is performed by purchasing green equity assets, such as Chinese Certified Emission Reduction (CCER) projects, green certificates and international green certificates. Based on the carbon emission data, the carbon offset module 20 trades the green equity assets of corresponding volume and preferred variety for offset, and generates offset information.

The offset information includes a purchase proof and an offset certificate. After the residual carbon emission offset operation is completed, the generated purchase proof and offset certificate are outputted to the certification module 30.

The certification module 30 is configured to determine a certification result of the carbon neutral entity based on the certification declaration information, the carbon emission data, the activity information and the offset information in combination with the carbon neutral certification standard.

It can be understood that the certification module 30 receives the certification declaration information, the carbon emission data and the activity information uploaded by the carbon emission determination module 10 as well as the offset information outputted by the carbon offset module 20. After being received, the uploaded data is verified, and is submitted to a certification authority selected by the carbon neutral entity. The certification authority performs account and examination on data such as the carbon emission information, carbon emission data, activity information, green equity purchase and offset information, and determines whether to issue a carbon neutral certification certificate or give feedback if the examination fails based on the carbon neutral certification standard. The certification declaration information includes a certification authority, a carbon neutral range, a carbon neutral time period and carbon emission information. The carbon emission information may include an emission source type, emission source activity data and carbon reduction solution information. It can be understood that the emission source type and the emission source activity data may be determined based on the carbon neutral range and the carbon neutral time period.

In an embodiment, after the certification module 30 performs a preliminary examination on the certification declaration information, the carbon emission data and carbon asset trade offset residual carbon emission data uploaded by the carbon neutral entity and obtains a positive result, relevant data and a preliminary examination result are displayed to a third-party institution visually. The third-party institution performs account and examination on data such as the certification declaration information, the carbon emission data, activity data information and green equity purchase offset information, and performs the carbon neutral certification to the carbon neutral certification standard. In the embodiment, a verification method is not specifically limited. For example, the verification method may include checking the authenticity of data, the authenticity of the certificate and the like. In a case of passing the examination by the third-party institution, a carbon neutral certification certificate is issued. Otherwise, a feedback is given.

The database module 40 is configured to record various types of data generated by the carbon neutral entity during carbon neutral certification to share the data.

The database module 40 is configured to record various types of data generated by the carbon neutral entity during carbon neutral certification, and store relevant business flow data and configuration data, to share the data between multiple links and carbon neutral entity stakeholders. For a database, secure and tamper proof technologies such as distributed storage and encryption may be adopted to ensure data authenticity, consistency, auditability, and traceability, which is not limited here.

It should be noted that different stakeholders such as carbon neutral entities, trading centers, certification authorities and asset holders are involved in a process of carbon neutral certification. The different stakeholders have different rights to the carbon neutral certification module. In the process of carbon neutral certification, the carbon neutral system presents information related to the stakeholders to the stakeholders visually to achieve human-computer interaction in the process of carbon neutrality. For example, in a case of applying for certification, the certification system for carbon neutrality presents an application interface to the carbon neutral entity, and the carbon neutral entity inputs and uploads relevant application information through the application interface. In a case of trading by purchasing green equity assets, the carbon neutral entity may enable the system to provide a purchase interface by clicking a purchase button, and the carbon neutral entity may purchase green equity assets through the purchase interface to offset a residual carbon emission. Further, the system may present application purchase information of carbon neutrality to a trading center in a form of trading interface, and the trading center may determine the trade. Before the trade is successful, trade information may also be provided to the carbon neutral entity for confirmation. In a case that a carbon neutral certification stage is carried out, the system performs a preliminary examination on data uploaded by the carbon neutral entity, collected activity information, offset information and the like, and presents a result after the preliminary examination and these data to a certification authority. The certification authority further verifies relevant information displayed in the system based on a carbon neutral standard to determine whether this application for carbon neutrality of the carbon neutral entity has been approved. If approved, the certification authority may generate an electronic certification certificate through the system and send the electronic certification certificate to an interface presented for the carbon neutral entity. If not approved, the certification authority may generate a certification failure message through the system and send the certification failure message to the interface presented for the carbon neutral entity.

Figure 2:
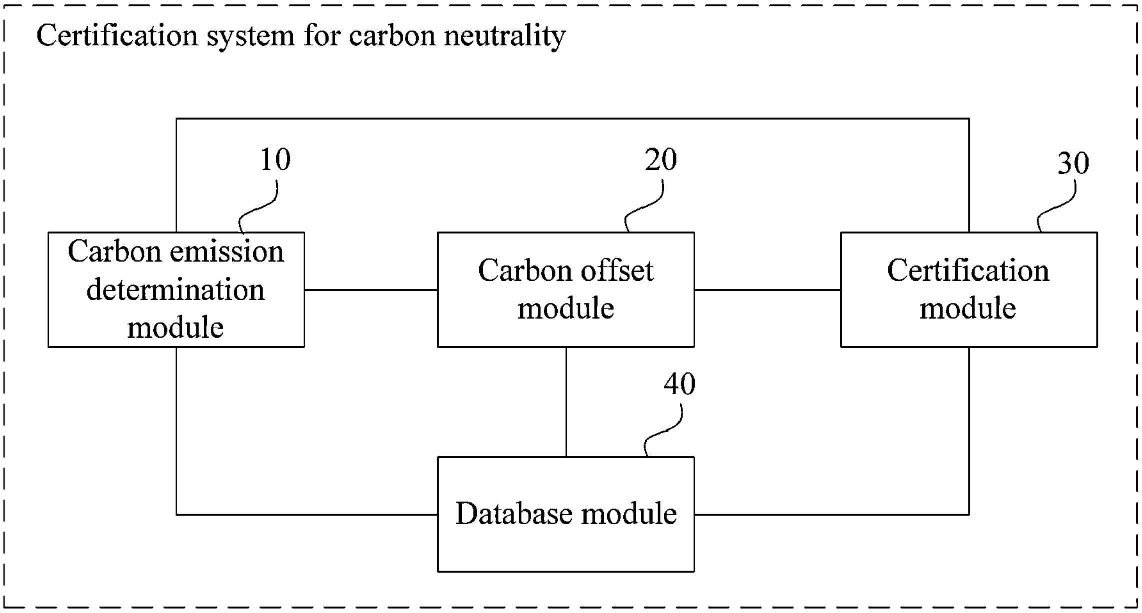
FIG. 2 is a schematic structural diagram illustrating the certification system for carbon neutrality according to another embodiment of the present disclosure.

FIG. 2 is a schematic structural diagram of another certification system for carbon neutrality according to the first embodiment of the present disclosure. Optionally, before performing the residual carbon emission offset operation, the carbon emission determination module 10 is further configured to send the carbon emission data and the activity information to the certification module; and the certification module is further configured to examination the carbon emission data and the activity information.

As shown in FIG. 2, another connection form of modules in the certification system for carbon neutrality is shown, in which data between may be exchanged the carbon emission determination module 10 and the certification module 30. The advantage of this connection form is that the carbon emission data may be accounted and examined by the carbon neutral certification module after being measured, and thus problems may be found and corrected as soon as possible, and a deviation of trading carbon assets during the carbon offset operation may be avoided. It can be understood that through the connection form of each module in the certification system for carbon neutrality according to the embodiment, a data transmission direction may be determined based on business requirements. For example, the data transmission direction may be unidirectional or bidirectional.

In an embodiment, a carbon emission determination module, a carbon offset module, a certification module and a database module are established to measure carbon emission data and information data in a range and a time period determined by this carbon neutral certification respectively. Green equity assets of preferred varieties are adopted to offset residual carbon emission data. The carbon emission data, activity information, offset information and other data are accounted and audited, and a carbon neutral certification certificate is issued and a feedback is given if the data passes the examination. With this one-stop carbon neutral certification, the efficiency is improved and a cost is reduced.

A certification system for carbon neutrality is disclosed according to an embodiment of the present disclosure. The system includes a carbon emission determination module, a carbon offset module, a certification module and a database module. The carbon emission determination module is configured to determine carbon emission data and activity information of a carbon neutral entity based on certification declaration information and carbon emission information of the carbon neutral entity. The carbon offset module is configured to perform a residual carbon emission offset operation based on the carbon emission data of the carbon neutral entity and generate offset information. The certification module is configured to determine a certification result of the carbon neutral entity based on the carbon emission information, the carbon emission data, the activity information and the offset information in combination with a carbon neutral certification standard. The database module is configured to store various types of data generated by the carbon neutral entity during carbon neutral certification to share the data. The above technical solution is different from the existing manual examination and certification method for carbon neutral certification. With the certification system for carbon neutrality, after receiving certification declaration information of the carbon neutral entity, carbon emission data and information data are determined by the carbon emission determination module and are provided to the carbon offset module. The carbon offset module performs the residual carbon offset operation based on the carbon emission data and sends offset information to the certification module. The certification module performs the carbon neutral verification based on the certification declaration information, the carbon emission data, activity information and the offset information, thus achieving the carbon neutral certification online. A database module is included according to the technical solution, so that data in the whole process of certification is sharable and public, which is convenient for a carbon neutral certification entity to acquire relevant information in the process of certification in time to optimize carbon footprint management and adjust carbon reduction solution, and convenient to improve the efficiency of examination and a pass rate of certification. On the basis of achieving one-stop carbon neutral automatic certification, a manual examination link is reduced, the efficiency of examination is improved, and an examination cost is reduced.

Figure 3:
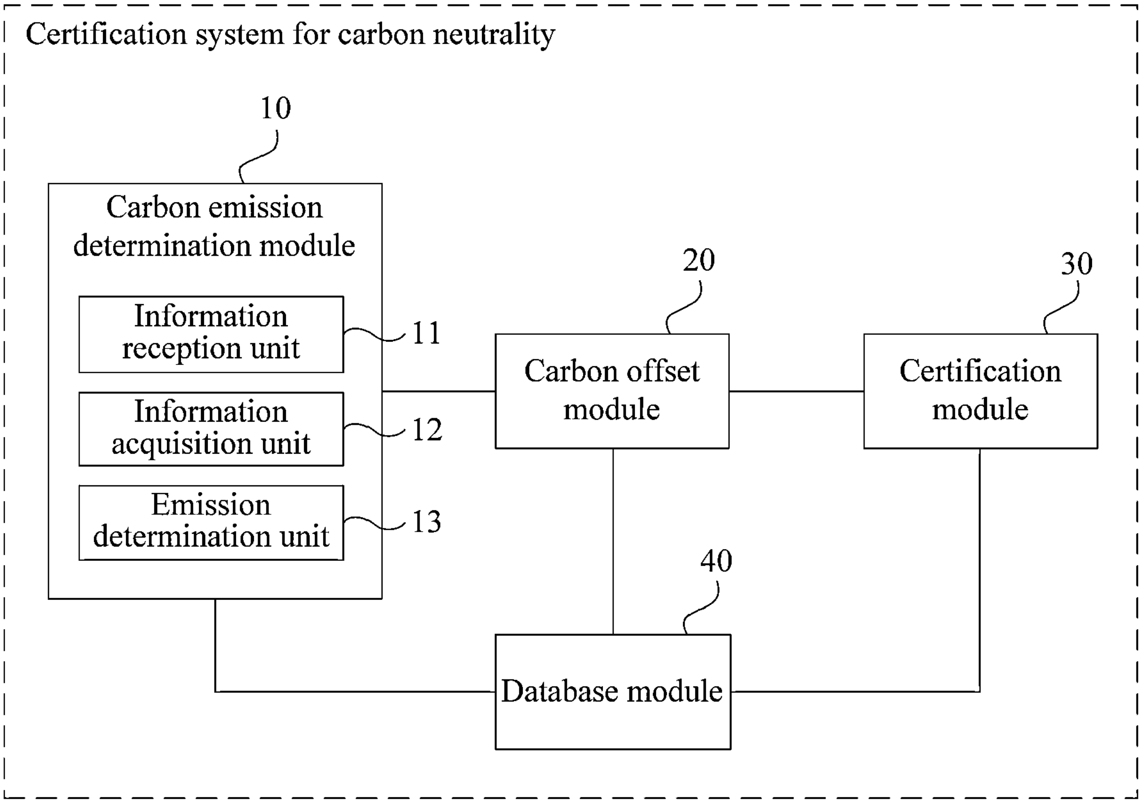
FIG. 3 is a schematic structural diagram illustrating the certification system for carbon neutrality according to another embodiment of the present disclosure.

FIG. 3 is a schematic structural diagram of another certification system for carbon neutrality according to the first embodiment of the present disclosure. This alternative embodiment is optimized based on the above first embodiment. In the alternative embodiment, the carbon emission determination module 10 includes, that is, an information reception unit 11 configured to receive an application operation of the carbon neutral entity for the carbon neutral certification, and determine the certification declaration information of the carbon neutral entity, where the certification declaration information at least includes a certification authority, a carbon neutral range, a carbon neutral time period and carbon emission information; an information acquisition unit 12 configured to determine the activity information based on the carbon neutral range, the carbon neutral time period and the carbon emission information; and an emission determination unit 13 configured to determine the carbon emission data of the carbon neutral entity based on the carbon neutral range, the carbon neutral time period and the carbon emission information in combination with a set carbon volume calculation model.

It can be understood that different certification authorities have different certification standards and certificates. For example, there are domestic certification authorities and foreign certification authorities. After the carbon neutral entity selects a certification authority, a carbon neutral standard of the certification authority may be further determined. The carbon neutral time period is used to determine activity data in which time period is to be collected and carbon emission data is calculated in this time period. The carbon emission information may include an emission source type, emission source activity data and carbon reduction solution information. Emission reduction solution may be understood as carbon offset solution before trading through purchasing green assets.

The information reception unit 11 may provide a carbon neutral certification declaration interface to the carbon neutral entity, to achieve an interaction between the certification system for carbon neutrality and the carbon neutral entity. In a case that the information reception unit 11 receives an application operation of the carbon neutral entity for carbon neutral certification, a certification authority applied by the carbon neutral entity, a carbon neutral range corresponding to a carbon neutral standard of the certification authority, and carbon emission information in which time period is to be collected may be determined. The information acquisition unit 12 is mainly configured to receive certification declaration information and activity information uploaded by the carbon neutral entity in the carbon neutral range and the carbon neutral time period. In addition, the activity information may also be automatically collected by the system or collected by other Internet of Things, application program interfaces, message queues, image recognition and video recognition. After collecting the relevant data, the emission determination unit 13 may determine carbon emission data of the carbon neutral entity based on the carbon neutral range, the carbon neutral time period and the carbon emission information uploaded by the carbon neutral entity with reference to the carbon neutral standard and in combination with a set carbon volume calculation model. It can be understood that the carbon volume calculation model refers to different emission sources, which correspond to different calculation methods. Based on the calculation methods, the carbon emission data of the carbon neutral entity may be determined. The carbon emission data refers to a residual carbon emission after carbon offset through emission reduction solution.

Further, the carbon emission information includes at least an emission source type, emission source activity data and carbon reduction solution information, the emission source type and the emission source activity data are determined based on the carbon neutral range and the carbon neutral time period, and in a case that carbon reduction solution is implemented after collecting the carbon emission information, the emission determination unit 13 is configured to perform the following operations a1 to a d1.

In a1, a carbon emission factor and the carbon volume calculation model are acquired based on the emission source type.

The carbon emission factor refers to an amount of carbon emissions per unit of energy during the combustion or use of energy. In an embodiment, based on the emission source type with reference to an emission source type corresponding to the carbon neutral standard, which types of carbon emission volumes are to be determined in this carbon neutral certification are determined. Each type of emission source corresponds to an emission factor and a carbon volume calculation model.

In b1, a carbon emission volume of the carbon neutral entity is determined based on the carbon emission factor, the carbon volume calculation model and the emission source activity data.

In an embodiment, based on the emission source activity data required by the carbon neutral standard, the carbon emission factor and the activity data are input into the carbon volume calculation model, to calculate the carbon emission volume of the carbon neutral entity.

In c1, a carbon reduction volume of the carbon neutral entity is determined based on the carbon reduction solution information of the carbon neutral entity.

In an embodiment, if some of emission reduction solution is implemented after measuring, a carbon emission volume of the carbon neutral entity is generally re-evaluated or measured. Based on the emission reduction solution of the carbon neutral entity, a carbon reduction volume that may be offset by the emission reduction solution is determined. For example, for an enterprise, low-carbon transportation is used to attend this activity, and low-carbon environmental protection supplies are used in a venue. The solution may be considered as the emission reduction solution. Based on the emission reduction solution, a carbon reduction volume of the carbon neutral entity may be determined.

In d1, the carbon reduction volume is subtracted from the carbon emission volume to obtain the carbon emission data of the carbon neutral entity.

In an embodiment, the carbon reduction volume is subtracted from the total carbon emission volume, and an obtained result is used as the carbon emission data of the carbon neutral entity. It can be understood that for the carbon emission data, the carbon neutral entity is required to perform a carbon offset operation by purchasing green equity assets.

Optionally, in a case that the carbon reduction solution is implemented before collecting the carbon emission information, the emission determination unit is configured to acquire the carbon emission factor and the carbon volume calculation model based on the emission source type; and determine the carbon emission data of the carbon neutral entity based on the carbon emission factor, the carbon volume calculation model and the emission source activity data.

In an embodiment, carbon neutral emission reduction solution is implemented before collecting carbon emission information, and collected data has reflected an effect of the emission reduction solution. Therefore, in a case that the emission reduction solution is implemented before collecting the carbon emission information, the obtained carbon emission information may be directly used to calculate the carbon emission data, and there is no need to subtract the carbon reduction volume from the carbon emission volume. At this time, the carbon emission information is not required to include carbon reduction solution information. The remaining steps are executed in a same way as above, which are not explained here.

In an alternative embodiment of the embodiment of the present disclosure, the carbon offset module 20 is further optimized based on the above embodiment, and is configured to perform the following operations a2 to c2.

In a2, a residual carbon emission offset mode is determined based on the carbon emission data of the carbon neutral entity, and an offset volume in the residual carbon emission offset mode is determined based on the residual carbon emission offset mode.

The residual carbon emission offset mode refers to a mode in which the carbon offset is performed by purchasing green equity assets, such as CCER projects, domestic green certificates and international green certificates. The offset volume in the residual carbon emission offset mode may be understood as the volume of green equity assets to be purchased. In an embodiment, based on the carbon emission data, the corresponding volume of the above green equity assets is matched and purchased to offset the carbon emission data.

In b2, carbon offset is performed based on the residual carbon emission offset mode and the offset volume.

In an embodiment, the corresponding volume of green equity assets is purchased for carbon offset.

In c2, the offset information is generated.

In an embodiment, after the carbon emission offset operation is completed, the offset information such as a purchase certificate and an offset certificate is generated and sent to the certification module 30.

This alternative embodiment is optimized based on the above first embodiment. In the alternative embodiment, the certification module 30 is configured to perform the following operations a3 to e3.

In a3, preliminary examination is performed on the certification declaration information, the carbon emission data, the activity information and the offset information to the carbon neutral certification standard.

In an embodiment, the system performs account and examination on data such as the certification declaration information, the carbon emission data, the activity information and the offset information.

In b3, in a case that the certification declaration information, the carbon emission data, the activity information and the offset information pass the preliminary examination, the certification declaration information, the carbon emission data, the activity information and the offset information are displayed to the certification authority visually.

In an embodiment, in a case that the certification declaration information, the carbon emission data, the activity information and the offset information pass the preliminary examination, the carbon emission information, the carbon emission data, the activity information and the offset information are displayed to the certification authority visually. The certification authority referred to here may be selected by the carbon neutral entity, or may also be automatically matched. The certification authority performs the account and examination on relevant data in the system, and determines whether to issue a carbon neutral certification certificate or give feedback if the examination fails based on the carbon neutral certification standard.

In c3, a confirmation operation by the certification authority is received.

In an embodiment, the certification system for carbon neutrality may provide the certification authority with a relevant confirmation page for the user to confirm whether the operation indicates success.

In d3, in a case that the confirmation operation indicates success, it is determined that the certification result of the carbon neutral entity is a positive result.

In an embodiment, in a case that the data successfully passes the examination, it is determined that the certification result of the carbon neutral entity is a positive result, and a certification certificate of the carbon neutral entity is generated and sent to the carbon neutral entity for checking.

In e3, in a case that the confirmation operation indicates failure, carbon neutral certification failure prompt information of the carbon neutral entity is generated.

In an embodiment, in a case that the data fails to pass the examination, the carbon neutral certification failure prompt information of the carbon neutral entity is generated and sent to the carbon neutral entity for checking.

Figure 4:
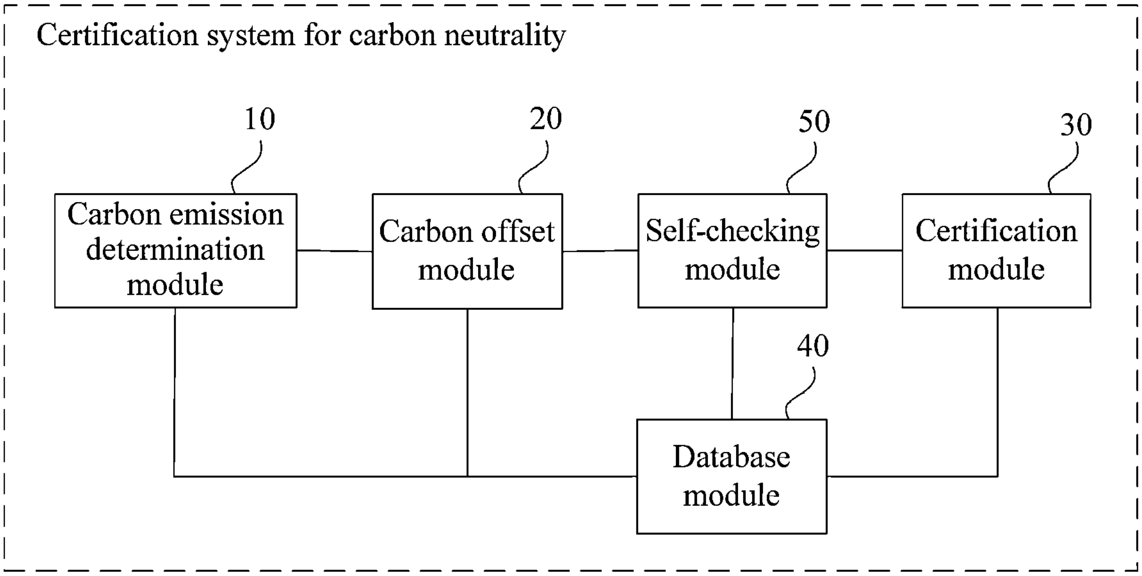
FIG. 4 is a schematic structural diagram illustrating the certification system for carbon neutrality according to another embodiment of the present disclosure.

FIG. 4 is a schematic structural diagram of another certification system for carbon neutrality according to the first embodiment of the present disclosure. This alternative embodiment is optimized based on the above first embodiment. In the embodiment, the system further includes a self-checking module 50, which is configured to: before the certification module performs certification on the carbon neutral entity, perform self-checking on the certification declaration information, the carbon emission data, the activity information and the offset information.

In an embodiment, the self-checking module 50 is added between the carbon offset module 20 and the certification module 30. A preliminary examination is performed on the certification declaration information, uploaded data, carbon emission measurement data and carbon asset trade offset residual carbon emission data inputted by the carbon neutral entity, which are outputted to the certification module 30 after data successfully passes the preliminary examination. Otherwise, a feedback is given. Therefore, the data may be checked earlier, which is beneficial to improving the efficiency of carbon neutral certification.

The self-checking module may perform self-checking before the certification module performs certification. Alternatively, self-checking may be performed all the time during the daily dual carbon work to adjust the dual carbon work in time. The advantage of adding the self-checking module is that verification may be performed before certification, so that the points that do not meet the certification standard may be adjusted in time to improve the efficiency and pass rate of certification. Interactive verification is performed on the carbon emission data, activity data information, green equity purchase, offset information and other data to improve the quality of risk control, reduce the workload and unqualified rate of manual examination links, improve the efficiency and reduce a cost.

Figure 5:
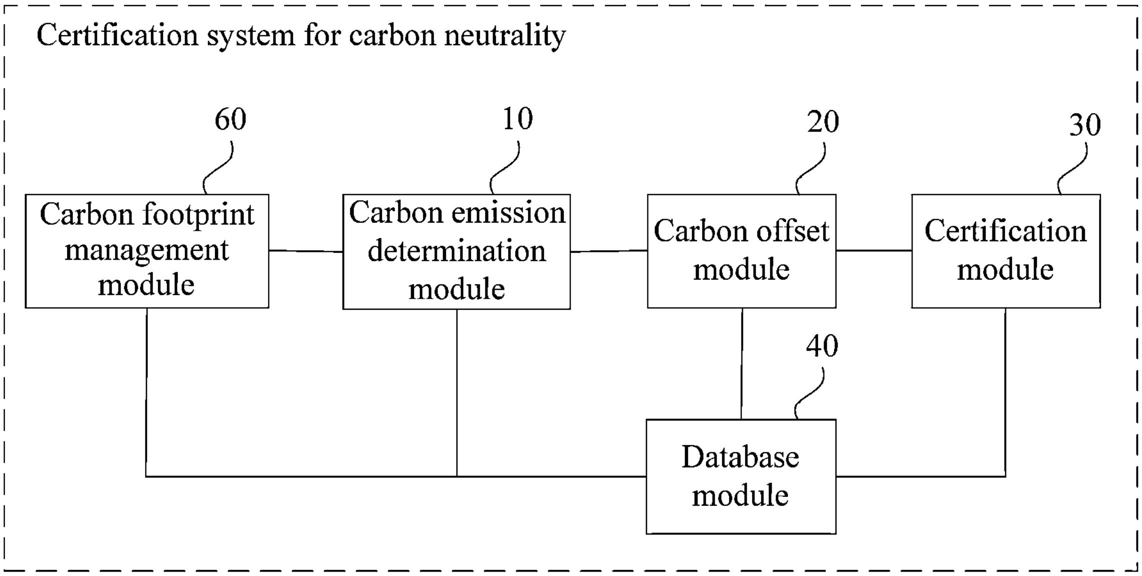
FIG. 5 is a schematic structural diagram illustrating the certification system for carbon neutrality according to another embodiment of the present disclosure.

FIG. 5 is a schematic structural diagram of another certification system for carbon neutrality according to the first embodiment of the present disclosure. This alternative embodiment is optimized based on the above first embodiment. In the embodiment, the system further includes a carbon footprint management module 60, which is configured to optimize a carbon footprint of the carbon neutral entity based on the certification result and similar case data applied for certification with the carbon neutral entity.

Figure 6:
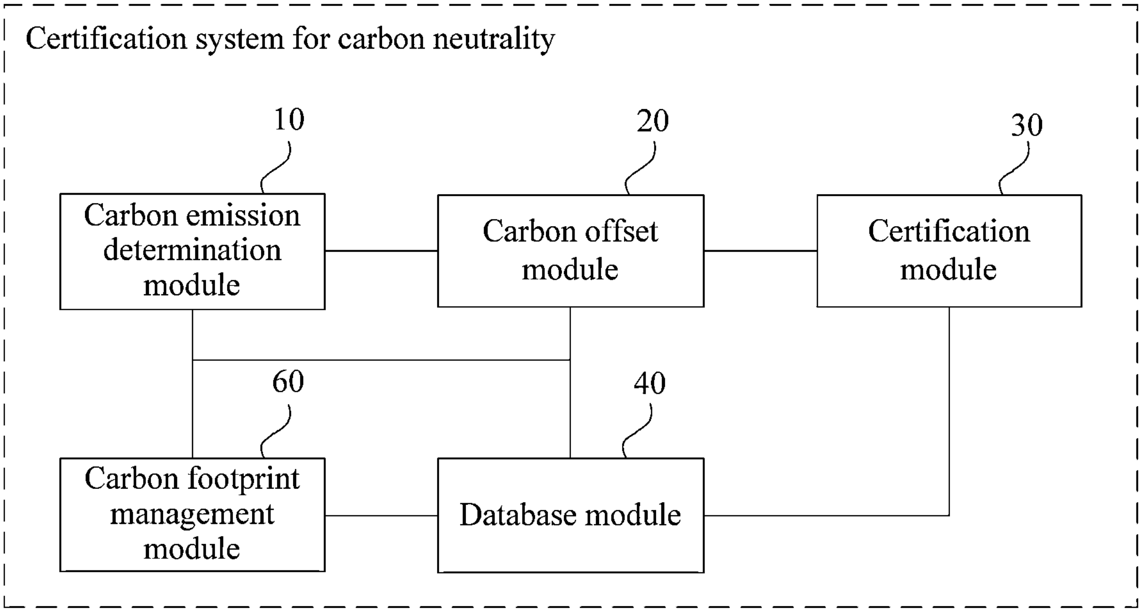
FIG. 6 is a schematic structural diagram illustrating the certification system for carbon neutrality according to another embodiment of the present disclosure.

In an embodiment, the carbon footprint management module 60 may be understood as being configured to manage the carbon footprint. The carbon footprint management module is added to the certification system for carbon neutrality according to the above embodiment to optimize the carbon footprint of the carbon neutral entity. Through the carbon emission determination module 10, the carbon emission of the carbon neutral range and activity content may be estimated and calculated, the carbon footprint may be continuously optimized in combination with historical, real-time data and similar case data, and carbon reduction solution may be adopted to find an optimal carbon emission scheme and actively optimize management. Before the carbon offset is performed, various ways may be used to reduce carbon, reduce carbon emissions and improve the gold content of carbon neutral certification. Optionally, FIG. 6 is a schematic structural diagram of another certification system for carbon neutrality according to the first embodiment of the present disclosure. An example diagram shown in FIG. 6 is a modification based on the structure shown in FIG. 5, and data may be interacted between the carbon footprint management module 60 and the carbon offset module 20.

Through the carbon footprint management module, in a case that the data fails to pass the certification, similar case data may be combined as a reference to optimize and adjust its own carbon footprint, such as to timely adjust its own dual carbon planning and carbon reduction solution, which is conducive to improving a pass rate of certification.

Second Embodiment

Figure 7:
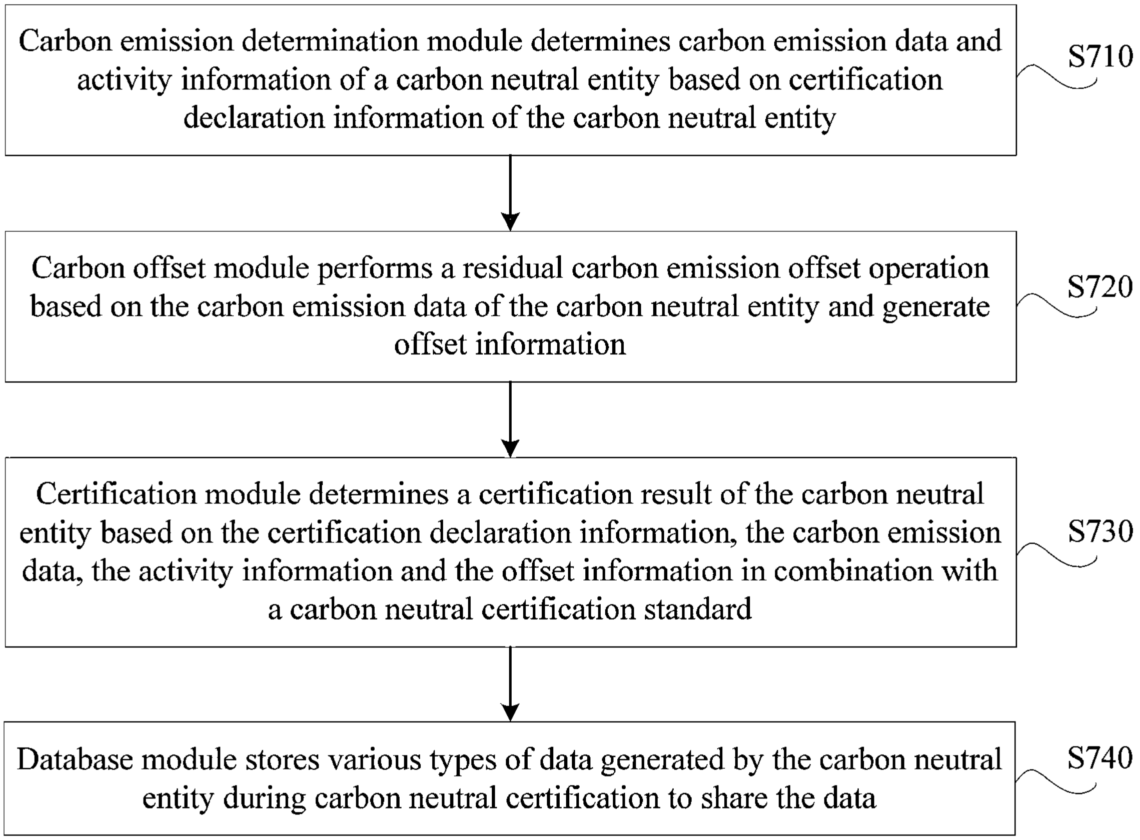
FIG. 7 is a schematic flowchart illustrating a certification method for carbon neutrality according to a second embodiment of the present disclosure.

FIG. 7 is a schematic flowchart of a carbon neutral certification method according to a second embodiment of the present disclosure. The method is suitable for a case of carbon neutral certification. The method may be implemented by the certification system for carbon neutrality according to the above embodiment. The system may be implemented by hardware and/or software and is generally integrated in an electronic device. As shown in FIG. 7, a carbon neutral certification method according to a second embodiment includes the following steps S710 to S740.

In S710, carbon emission data and activity information of a carbon neutral entity are determined by a carbon emission determination module based on certification declaration information of the carbon neutral entity.

The carbon neutral certification work is applicable to all organizations, products and activities for which carbon neutral certification is necessary, which proves that all organizations, sites and activities each have a reliable carbon footprint, a promise to reduce emissions year-on-year, and emission reduction plans to fulfill their commitments, and the residual carbon footprint is offset with the verified carbon sink and/or carbon credits. Carbon neutral certification involves carbon footprint management and planning, implementation of carbon reduction solution, carbon emission measurement, residual carbon offset, certification by third-party institutions and the like. In an embodiment, based on a data flow and a business flow in each stage of the carbon neutral certification work, the carbon emission determination module 10, the carbon offset module 20, the certification module 30 and the database module forms the certification system for carbon neutrality, which is configured for one-stop online certification of carbon neutral certification. The carbon emission determination module is configured to determine the carbon emission data and the activity information of the carbon neutral entity based on the certification declaration information of the carbon neutral entity.

The carbon neutral entity may include all levels of governments, organizations and individuals dedicated to carry out carbon neutrality. In order to facilitate the description, in an embodiment, an enterprise is taken as an example of the carbon neutral entity, which is not limited to the enterprise. In a case that the carbon neutral entity requires carbon neutral certification, a carbon neutral certification process of the carbon neutral entity about this activity may be carried out through the certification system for carbon neutrality according to the embodiment. The carbon neutral system according to the embodiment provides a visual interface to achieve human-computer interaction between the carbon neutral entity and the system. In an embodiment, the certification system for carbon neutrality provides a visual interface for receiving a carbon neutral certification application of the carbon neutral entity. For example, the visual interface of the certification system for carbon neutrality may include controls such as a login button, a carbon neutral application button, an application cancellation button and an applied record. The carbon neutral entity logs into the certification system for carbon neutrality by inputting its own account and password, to perform operations related to carbon neutral certification.

In an embodiment, in order to carry out the carbon neutral certification, the carbon neutral entity applies for carbon neutral certification through the carbon neutral system and writes certification declaration information to the carbon neutral system. The certification declaration information may include a certification authority, a carbon neutral range, a time period and carbon emission information. The carbon emission information at least includes an emission source type, emission source activity data and carbon reduction solution information. The activity data may be understood as a credential used to prove the authenticity of carbon emission data, such as a credential used to prove the authenticity of carbon emission source activity data. The carbon emission determination module is mainly configured to monitor a carbon neutral range and carbon emission for the carbon neutral entity in a certain time period. The carbon neutral entity may select or write a certification authority, determine a carbon neutral range, a time period, commitment and a plan, and take carbon reduction solution in the carbon neutral system. After determining the carbon neutral range and the time period, the carbon neutral entity may write carbon reduction solution and activity data in the system based on a carbon neutral standard, or carbon reduction solution and activity data may be automatically collected by the system or collected and uploaded by the Internet of Things, and then relevant information is uploaded.

In an embodiment, an emission source and activity data required for carbon neutrality are collected, including range 1, range 2 and range 3 required by a carbon neutral standard. Range 1 refers to direct emissions: direct greenhouse gas emissions from directly controlled fuel combustion activities and physical and chemical production processes. Range 2 refers to indirect emissions: greenhouse gas emissions generated by outsourced energy, including electricity, heat, steam and cold air. Range 3 refers to indirect emissions of activities in an upstream and an downstream of a value chain: covering a wide range of activity types in the upstream and downstream. Data sources may come from the Internet of Things, application program interfaces, message queues, image recognition, video recognition and manual input. Carbon emission measurement is vital in carbon neutrality. If carbon neutrality is to be achieved, it is necessary to know how much carbon is emitted, and then carbon absorption may be done based on the data. Based on carbon emission information, carbon emission data may be determined, and a residual carbon emission offset is to be perform based on the carbon emission data. The carbon emission determination module may determine carbon emission data of the carbon neutral entity based on carbon emission data, and may determine carbon emission data of the carbon neutral entity based on emission reduction solution.

In an embodiment, the carbon emission determination module determines carbon emission data and activity information of a carbon neutral entity based on certification declaration information and carbon emission information of the carbon neutral entity, and outputs the carbon emission data and the activity information within a range and a time period determined by this carbon neutral certification to the carbon offset module and the certification module to provide data related to carbon neutrality for the carbon offset module and the certification module.

In S720, a residual carbon emission offset operation is performed by a carbon offset module based on the carbon emission data of the carbon neutral entity, and offset information is generated.

In an embodiment, after the carbon offset module receives the carbon emission data provided by the carbon emission determination module and the carbon neutral entity performs emission reduction solution, the carbon offset is performed by purchasing green equity assets, such as Chinese Certified Emission Reduction (CCER) projects, green certificates and international green certificates. Based on the carbon emission data, the carbon offset module trades the green equity assets of corresponding volume and preferred variety for offset, and generates offset information. The offset information includes a purchase proof and an offset certificate. After the residual carbon emission offset operation is completed, the generated purchase proof and offset certificate are outputted to the certification module.

In S730, a certification result of the carbon neutral entity is determined by a certification module based on the certification declaration information, the carbon emission data, the activity information and the offset information in combination with the carbon neutral certification standard.

It can be understood that the certification module receives the certification declaration information, the carbon emission data and the activity information uploaded by the carbon emission determination module as well as the offset information output by the carbon offset module. After receiving the uploaded data, the uploaded data is verified, and the verified data is submitted to a certification authority selected by the carbon neutral entity. The certification authority performs account and examination on data such as the carbon emission information, carbon emission data, activity information, green equity purchase and offset information, and determines whether to issue a carbon neutral certification certificate or give feedback if the data fails to pass the examination to the carbon neutral certification standard. The certification declaration information includes a certification authority, a carbon neutral range, a carbon neutral time period and carbon emission information. The carbon emission information may include an emission source type, emission source activity data and carbon reduction solution information. It can be understood that the emission source type and the emission source activity data may be determined based on the carbon neutral range and the carbon neutral time period.

In an embodiment, after the certification module performs a preliminary examination on the carbon emission information, the carbon emission data and carbon asset trade offset residual carbon emission data uploaded by the carbon neutral entity and the data passes the preliminary examination, relevant data and a preliminary examination result are displayed to f a third-party institution, i.e., a certification authority selected by the carbon neutral entity at the time of applying certification visually. The third-party institution performs account and examination on data such as the carbon emission information, the carbon emission data, activity data information and green equity purchase offset information, and performs carbon neutral certification based on the carbon neutral certification standard. In the embodiment, a verification method is not specifically limited. For example, the verification method may include checking the authenticity of data, the authenticity of the certificate and the like. In a case of passing the examination by the third-party institution, a carbon neutral certification certificate is issued. Otherwise, a feedback is given.

In S740, various types of data generated by the carbon neutral entity during carbon neutral certification is stored by a database module to share the data.

The database module records various types of data generated by the carbon neutral entity during carbon neutral certification, and stores relevant business flow data and configuration data, to share the data between multiple links and carbon neutral entity stakeholders. For a database, secure and tamper proof technologies such as distributed storage and encryption may be adopted to ensure data authenticity, consistency, auditability, and traceability, which is not limited here.

Optionally, the carbon emission data and activity information of a carbon neutral entity are determined by a carbon emission determination module based on certification declaration information of the carbon neutral entity by the following operations a1 to c1.

In a1, an application operation of the carbon neutral entity for the carbon neutral certification is received, and the certification declaration information of the carbon neutral entity is determined. The certification declaration information includes at least a certification authority, a carbon neutral range, a carbon neutral time period and carbon emission information.

It can be understood that different certification authorities have different certification standards and certificates. For example, there are domestic certification authorities and foreign certification authorities. After the carbon neutral entity selects a certification authority, a carbon neutral standard of the certification authority may be further determined. The carbon neutral time period is used to determine which time period of activity data to be collected and calculate carbon emission data in this time period. The carbon emission information may include an emission source type, emission source activity data and carbon reduction solution information. Emission reduction solution may be understood as carbon offset solution before trading through purchasing green assets.

In an embodiment, a carbon neutral certification declaration interface may be provided to the carbon neutral entity, to achieve an interaction between the certification system for carbon neutrality and the carbon neutral entity. In a case of receiving an application operation of the carbon neutral entity for carbon neutral certification, a certification authority applied by the carbon neutral entity, a carbon neutral range corresponding to a carbon neutral standard of the certification authority, and which time period of carbon emission information being required to be collected may be determined.

In b1, the activity information is determined based on the carbon neutral range, the carbon neutral time period and the carbon emission information.

In an embodiment, carbon emission information and activity information uploaded by the carbon neutral entity are received. In addition, the activity information may also be automatically collected by the system or collected by other Internet of Things, application program interfaces, message queues, image recognition and video recognition.

In c1, the carbon emission data of the carbon neutral entity is determined based on the carbon neutral range, the carbon neutral time period and the carbon emission information in combination with a set carbon volume calculation model.

After collecting the relevant data, carbon emission data of the carbon neutral entity may be determined based on the carbon neutral range, the carbon neutral time period and the carbon emission information uploaded by the carbon neutral entity with reference to the carbon neutral standard and in combination with a set carbon volume calculation model. It can be understood that the carbon volume calculation model refers to different emission sources, which correspond to different calculation methods. Based on the calculation methods, the carbon emission data of the carbon neutral entity may be determined. The carbon emission data refers to a residual carbon emission after carbon offset through emission reduction solution.

Optionally, the a residual carbon emission offset operation is performed by a carbon offset module based on the carbon emission data of the carbon neutral entity, and offset information is generated by the following operations a2 to c2.

In a2, a residual carbon emission offset mode is determined based on the carbon emission data of the carbon neutral entity, and an offset volume in the residual carbon emission offset mode is determined based on the residual carbon emission offset mode.

The residual carbon emission offset mode refers to a mode in which the carbon offset is performed by purchasing green equity assets, such as CCER projects, domestic green certificates and international green certificates. The offset volume in the residual carbon emission offset mode may be understood as the volume of green equity assets to be purchased. In an embodiment, based on the carbon emission data, the corresponding volume of the above green equity assets is matched and purchased to offset the carbon emission data.

In b2, carbon offset is performed based on the residual carbon emission offset mode and the offset volume.

In an embodiment, the corresponding volume of green equity assets is purchased to complete offset with the carbon emission data.

In c2, the offset information is generated.

In an embodiment, after the carbon emission offset operation is completed, the offset information such as a purchase certificate and an offset certificate is generated.

Optionally, the a certification result of the carbon neutral entity is determined by a certification module based on the certification declaration information, the carbon emission data, the activity information and the offset information in combination with a carbon neutral certification standard by the following operations a3 to e3.

In a3, preliminary examination is performed on the certification declaration information, the carbon emission data, the activity information and the offset information based on the carbon neutral certification standard.

In an embodiment, the system performs account and examination on data such as the certification declaration information, the carbon emission data, the activity information and the offset information.

In b3, in a case that the data successfully passes the preliminary examination, the certification declaration information, the carbon emission data, the activity information and the offset information are displayed to the certification authority visually In an embodiment, in a case that the data successfully passes the preliminary examination, the carbon emission information, the carbon emission data, the activity information and the offset information are displayed to the certification authority visually. The certification authority referred to here may be selected by the carbon neutral entity, or may also be automatically matched without being selected by the carbon neutral entity. The certification authority performs account and examination on relevant data in the system, and determines whether to issue a carbon neutral certification certificate or give feedback if the examination fails based on the carbon neutral certification standard.

In c3, a confirmation operation by the certification authority is received.

In an embodiment, the certification system for carbon neutrality may provide the certification authority with a relevant confirmation page for the user to confirm whether the operation indicates success.

In d3, in a case that the confirmation indicates success, it is determined that the certification result of the carbon neutral entity is a positive result.

In an embodiment, in a case that the data successfully passes the examination, it is determined that the certification result of the carbon neutral entity is a positive result, and a certification certificate of the carbon neutral entity is generated and sent to the carbon neutral entity for checking.

In e3, in a case that the confirmation operation indicates failure, carbon neutral certification failure prompt information of the carbon neutral entity is generated.

In an embodiment, in a case that the data fails to pass the examination, the carbon neutral certification failure prompt information of the carbon neutral entity is generated and sent to the carbon neutral entity for checking.

The carbon neutral certification method according to the embodiment of the present disclosure may be executed by the certification system for carbon neutrality according to any embodiment of the present disclosure, which has corresponding functional modules and beneficial effects for performing the method.

Figure 8:
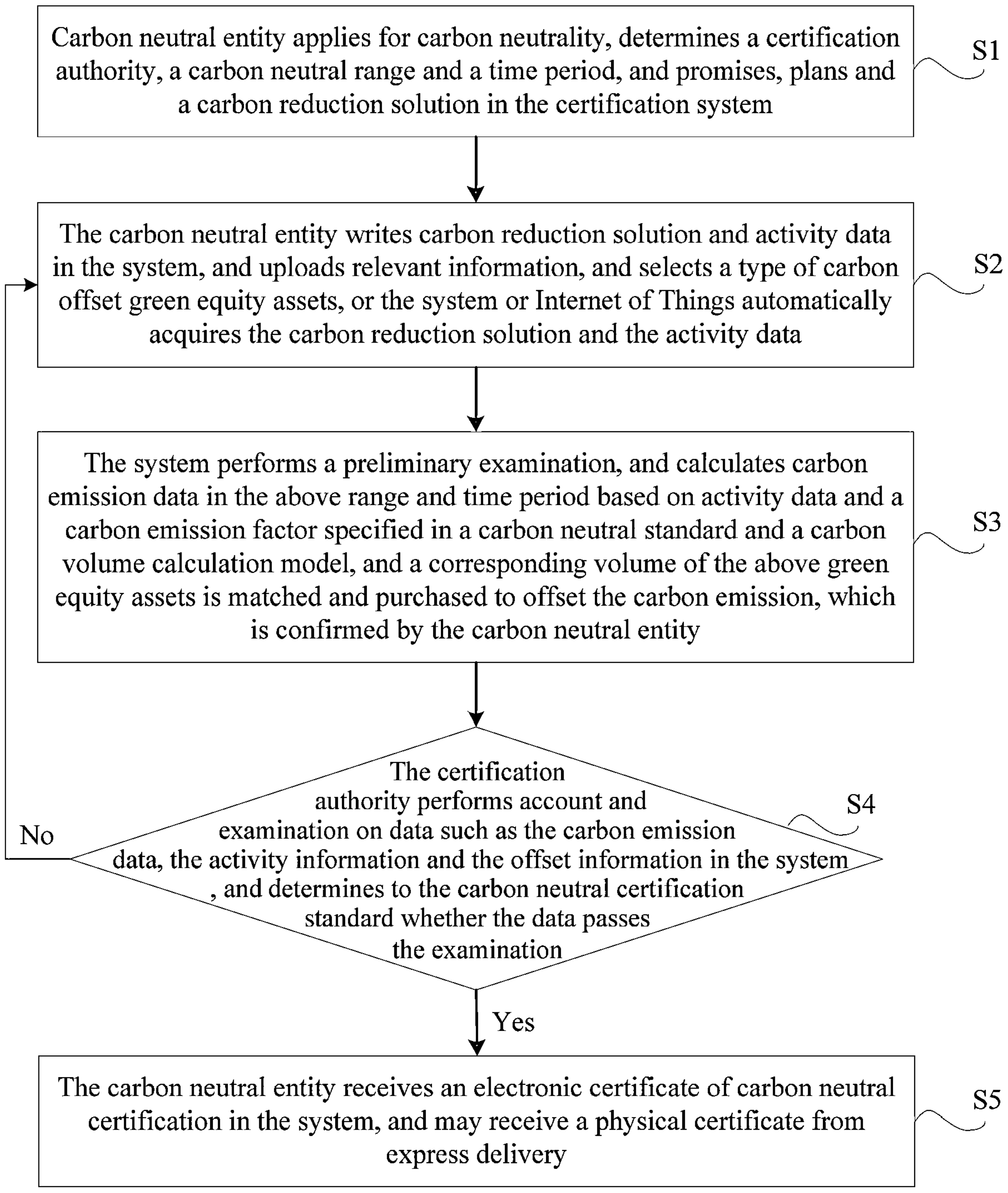
FIG. 8 is an example flowchart illustrating the certification method for carbon neutrality in an application scenario according to the second embodiment of the present disclosure.

In order to express the embodiments of the present disclosure more clearly, a carbon neutral certification process in a certain scenario is taken as an example, and an interaction in which a carbon neutral entity, a certification authority and other stakeholders perform the carbon neutral certification process through a certification system for carbon neutrality according to an embodiment is described. For example, FIG. 8 is an example flowchart of a carbon neutral certification method in a certain scenario according to the second embodiment of the present disclosure. As shown in FIG. 8, an example of performing a carbon neutral certification workflow using the certification system for carbon neutrality is shown. The following steps S1 to S5 are included.

In S1, the carbon neutral entity applies for carbon neutrality in the certification system for carbon neutrality (hereinafter referred to as the system), determines a certification authority, a carbon neutral range and a time period, and promises, plans and carbon reduction solution.

In S2, the carbon neutral entity writes the carbon reduction solution and the activity data in the system, or carbon reduction solution and activity data are automatically collected by the system or collected and uploaded by the Internet of Things, and relevant information is uploaded, and a type of carbon offset green equity assets is selected.

In S3, after the system performs a preliminary examination on uploaded data and the uploaded data passes the preliminary examination, carbon emission data in the above range and time period is calculated based on activity data and a carbon emission factor required by a carbon neutral standard and a carbon volume calculation model, and a corresponding volume of the above green equity assets is matched and purchased to offset the carbon emission, which is confirmed by the carbon neutral entity.

In S4, the certification authority performs account and examination on data such as the carbon emission data, activity information and offset information in the system, and judges whether the examination is passed based on a carbon neutral certification standard. If the data successfully passes the examination, step S5 is executed. Otherwise, an examination failed feedback is given and step S2 is re-executed.

In S5, the carbon neutral entity receives an electronic certificate of carbon neutral certification in the system, and may receive a physical certificate from express delivery.

Figure 9:
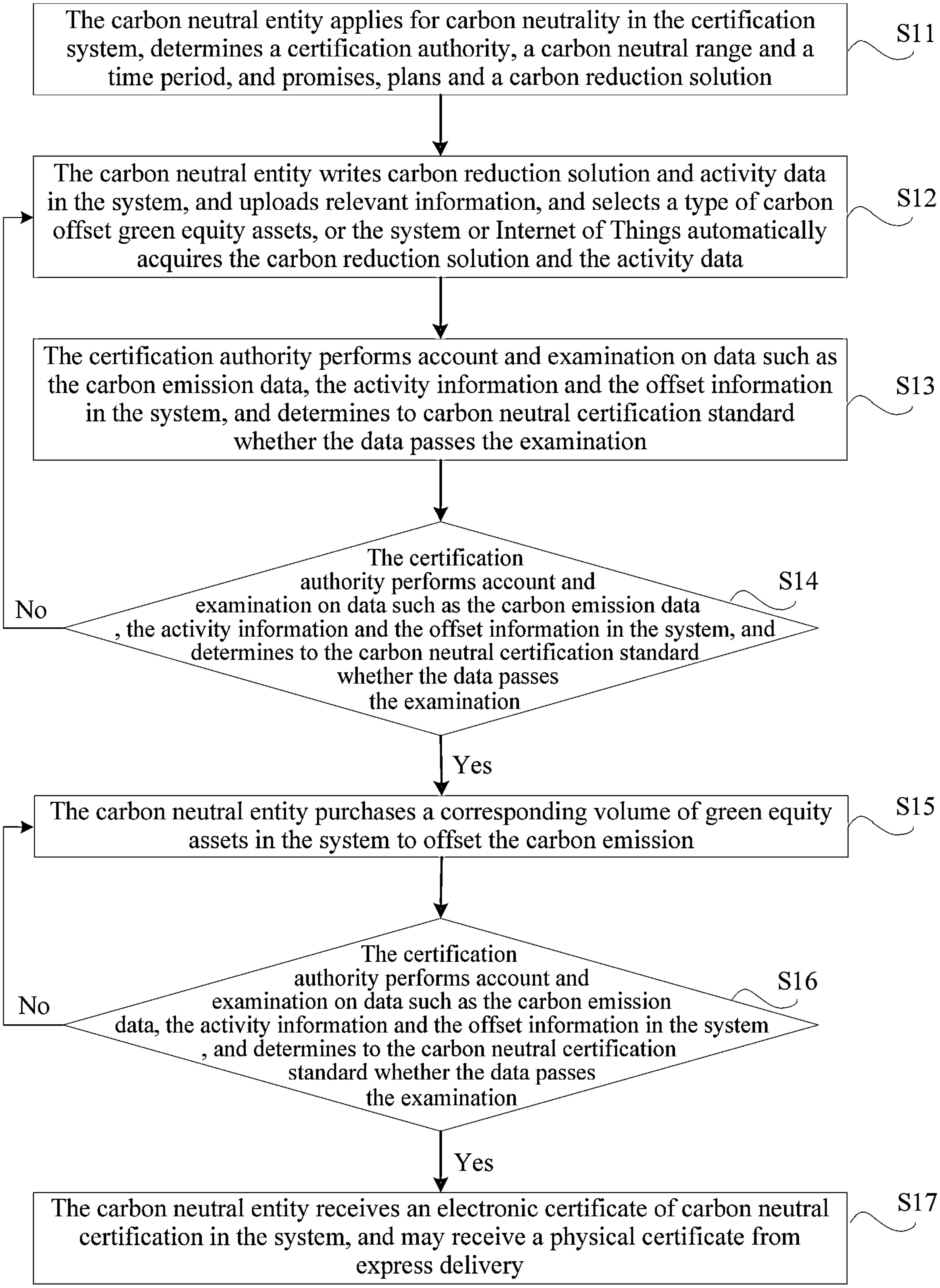
FIG. 9 is an example flowchart illustrating the certification method for carbon neutrality in another application scenario according to the second embodiment of the present disclosure.

FIG. 9 is an example flowchart of a carbon neutral certification method in another application scenario according to the second embodiment of the present disclosure. As shown in FIG. 9, another example of performing a carbon neutral certification workflow using the certification system for carbon neutrality is shown. The following steps S11 to S17 are included.

In S11, the carbon neutral entity applies for carbon neutrality in the certification system for carbon neutrality, determines a certification authority, a carbon neutral range and a time period, and promises, plans and a carbon reduction solution.

In S12, the carbon neutral entity applies for carbon neutrality in the system, determines a certification authority, a carbon neutral range and a time period, writes or uploads activity data, and uploads relevant information, and selects a type of carbon offset green equity assets.

In S13, after the system performs a preliminary examination on uploaded data and the data successfully passes the preliminary examination, carbon emission data in the above range and time period is calculated based on activity data and a carbon emission factor required by a carbon neutral standard and a carbon volume calculation model.

In S14, the certification authority performs account and examination on data such as the carbon emission data and activity information in the system, and determines whether the data successfully passes the examination. If the data has successfully passed the examination, step S15 is executed. Otherwise, step S12 is executed.

In S15, the carbon neutral entity purchases a corresponding volume of green equity assets in the system to offset the carbon emission.

In S16, the certification authority performs account and examination on data such as offset information in the system, and determines whether the data successfully passes the examination based on a carbon neutral certification standard. If the data has successfully passed the examination, step S17 is executed. Otherwise, step S15 is executed.

In S17, the carbon neutral entity receives an electronic certificate of carbon neutral certification in the system, and may receive a physical certificate from express delivery.

Third Embodiment

Figure 10:
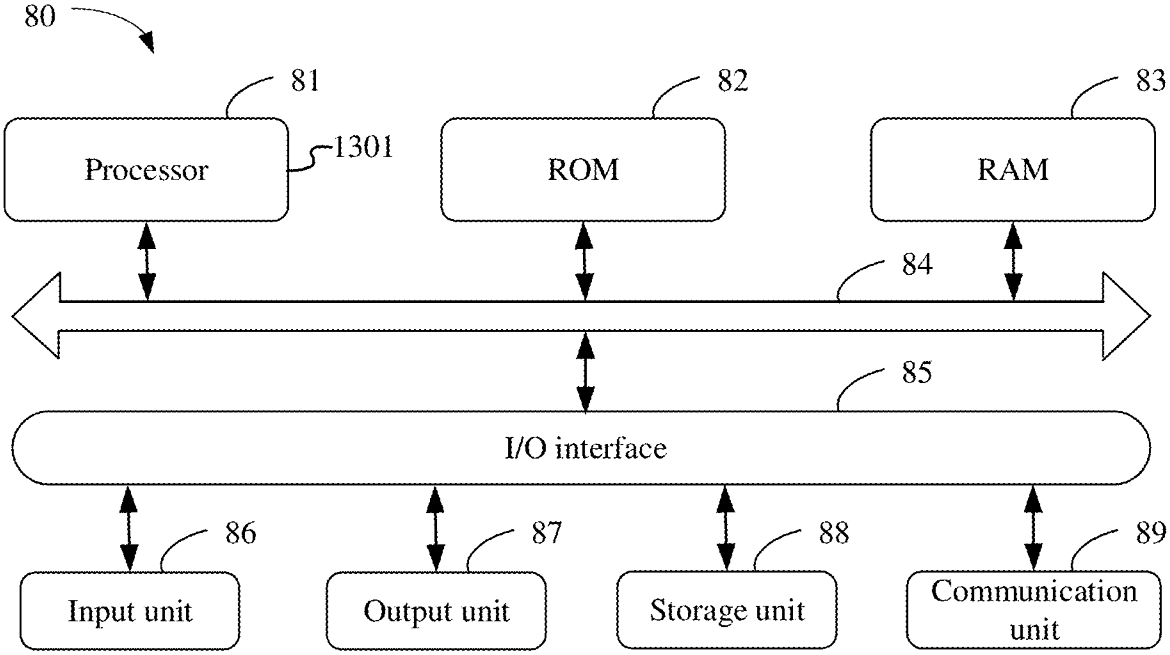
FIG. 10 is a schematic structural diagram illustrating an electronic device according to a third embodiment of the present disclosure.

FIG. 10 is a schematic structural diagram of an electronic device according to a third embodiment of the present disclosure. The electronic device is intended to represent various forms of digital computers, such as a laptop computer, a desktop computer, a working platform, a personal digital assistant, a server, a blade server, a mainframe computer, and other suitable computers. The electronic device may also represent various forms of mobile apparatuses, such as a personal digital processing unit, a cellular phone, a smart phone, a wearable device (such as a helmet, glasses and a watch) and other similar computing apparatuses. The components shown herein, their connections and relationships, and their functions are only examples, and are not intended to limit the implementation of the present disclosure described and/or claimed herein.

As shown in FIG. 10, the electronic device 80 includes at least one processor 81, and a memory, such as a read-only memory (ROM) 82 and a random access memory (RAM) 83, which is communicatively connected with the at least one processor 81. The memory is configured to store a computer program that may be executed by the at least one processor. The processor 81 may perform various actions and processes based on a computer program stored in the read-only memory (ROM) 82 or a computer program loaded into the random access memory (RAM) 83 from a storage unit 88. The RAM 83 is further configured to store various programs and data required by the electronic device 80 to perform an operation. The processor 81, the ROM 82 and the RAM 83 are connected to each other through a bus 84. An input/output (I/O) interface 85 is also connected to the bus 84.

Multiple components in the electronic device 80 are connected to the I/O interface 85, including an input unit 86, such as a keyboard and a mouse; an output unit 87, such as various types of displays and speakers; a storage unit 88, such as a magnetic disk and an optical disk; and a communication unit 89, such as a network card, a modem and a wireless communication transceiver. The communication unit 89 allows the electronic device 80 to exchange information/data with other devices through a computer network such as the Internet and/or various telecommunication networks.

The processor 81 may be various general-purpose and/or special-purpose processing components with processing and computing capabilities. Some examples of the processor 81 include, but are not limited to, a central processing unit (CPU), a graphics processing unit (GPU), various specialized artificial intelligence (AI) computing chips, various processors running machine learning model algorithms, a digital signal processor (DSP), and any suitable processor, controller, microcontroller, etc. The processor 81 performs various methods and processes described above, such as the carbon neutral certification method.

In some embodiments, the carbon neutral certification method may be implemented as a computer program tangibly embodied in a computer readable storage medium, such as the storage unit 88. In some embodiments, part or all of the computer program may be loaded and/or installed on the electronic device 80 via the ROM 82 and/or the communication unit 89. When the computer program is loaded into the RAM 83 and executed by the processor 81, one or more steps of the carbon neutral certification method described above may be performed. Alternatively, in other embodiments, the processor 81 may be configured to perform the carbon neutral certification method by any other suitable means (for example, by means of firmware).

Various embodiments of the systems and techniques described above herein may be implemented in digital electronic circuitry, integrated circuitry, field programmable gate arrays (FPGA), application specific integrated circuits (ASIC), application specific standard products (ASSP), system-on-a-chip (SOC), complex programmable logic devices (CPLD), computer hardware, firmware, software, and/or their combinations. These various embodiments may include being implemented in one or more computer programs that may be executed and/or interpreted on a programmable system including at least one programmable processor, which may be a special-purpose or general-purpose programmable processor and may receive data and instructions from a storage system, at least one input apparatus, and at least one output apparatus, and transmit data and instructions to the storage system, the at least one input apparatus, and the at least one output apparatus.

The computer program for implementing the method of the present disclosure may be written in any combination of one or more programming languages. These computer programs may be provided to a processor of a general-purpose computer, a special-purpose computer or other programmable data processing apparatus, such that the computer programs, when executed by the processor, cause the functions/operations specified in the flowcharts and/or block diagrams to be implemented. A computer program may be completely executed on a machine, partially executed on a machine, partially executed on a machine as a separate software package and partially executed on a remote machine or completely executed on a remote machine or server.

In the context of the present disclosure, a computer readable storage medium may be a tangible medium, which may contain or store a computer program for use by or in combination with an instruction execution system, apparatus or device. The computer readable storage medium may include, but is not limited to, an electronic, magnetic, optical, electromagnetic, infrared, or semiconductor system, apparatus or device, or any suitable combination thereof. Alternatively, the computer readable storage medium may be a machine readable signal medium. More specific examples of the machine readable storage medium may include an electrical connection based on one or more lines, a portable computer disk, a hard disk, a random access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination thereof.

In order to provide interaction with a user, the systems and techniques described herein may be implemented on an electronic device having a display apparatus (for example, a cathode ray tube (CRT) or a liquid crystal display (LCD) monitor) for displaying information to the user; and a keyboard and a pointing apparatus (for example, a mouse or a trackball) through which the user may provide input to the electronic device. Other kinds of apparatuses may also be used to provide interaction with the user. For example, the feedback provided to the user may be any form of sensory feedback (for example, visual feedback, auditory feedback, or tactile feedback); and the input from the user may be received in any form (including acoustic input, voice input or tactile input).

The systems and techniques described herein may be implemented in a computing system that includes a back-end component (e.g., as a data server), a computing system that includes a middleware component (e.g., an application server), a computing system that includes a front-end component (e.g., a user computer with a graphical user interface or a web browser through which the user may interact with embodiments of the systems and techniques described herein), or a computing system that includes any combination of the back-end component, middleware component, or front-end component. Components of the system may be interconnected by any form or medium of digital data communication (for example, a communication network). Examples of the communication network include local area network (LAN), wide area network (WAN), blockchain network and the Internet.

The computing system may include a client and a server. The client and the server are generally far away from each other and usually interact through a communication network. A relationship between the client and the server is generated by computer programs running on corresponding computers and having a client-server relationship with each other. The server may be a cloud server, also known as a cloud computing server or cloud host, and is a host product in the cloud computing service system, to remedy the defects of difficult management and weak business scalability in the traditional physical host and VPS service.

It should be understood that steps may be reordered, added or deleted using the various forms of processes shown above. For example, the steps described in the present disclosure may be executed in parallel, sequentially or in a different order, so long as the desired result of the technical solution of the present disclosure can be achieved, which is not limited herein.

The above specific embodiments are not intended to limit the protection scope of the present disclosure. It should be understood by those skilled in the art that various modifications, combinations, sub combinations and substitutions may be made based on design requirements and other factors. Any modification, equivalent substitution and improvement made within the spirit and principle of the present disclosure should be included in the protection scope of the present disclosure.

The invention claimed is:

1. A certification system for carbon neutrality, comprising:

one or more processors; and a memory configured to store one or more programs, wherein the one or more programs, when executed by the one or more processors, cause the one or more processors to:

determine carbon emission data of a carbon neutral entity based on certification declaration information of the carbon neutral entity, and collect activity information of the carbon neutral entity by Internet of Things, image recognition or video recognition;

perform a residual carbon emission offset operation based on the carbon emission data of the carbon neutral entity and generate offset information;

perform self-checking on the certification declaration information, the carbon emission data, the activity information and the offset information;

determine a certification result of the carbon neutral entity based on the self-checked certification declaration information, carbon emission data, activity information and offset information in combination with a carbon neutral certification standard;

determine a carbon emission scheme based on the certification result and case data for certification similar with the carbon neutral entity, and regulate and guide a production process and/or activity of the carbon neutral entity based on the carbon emission scheme; and store data generated by the carbon neutral entity during carbon neutral certification to share the data.

2. The certification system according to claim 1, wherein the one or more programs, when executed by the one or more processors, cause the one or more processors to:

examine the carbon emission data and the activity information before the residual carbon emission offset operation is performed.

3. The certification system according to claim 1, wherein the one or more programs, when executed by the one or more processors, cause the one or more processors to:

receive an application operation of the carbon neutral entity for the carbon neutral certification, and determine the certification declaration information of the carbon neutral entity, wherein the certification declaration information comprises at least a certification authority, a carbon neutral range, a carbon neutral time period and carbon emission information;

determine the activity information based on the carbon neutral range, the carbon neutral time period and the carbon emission information; and determine the carbon emission data of the carbon neutral entity based on the carbon neutral range, the carbon neutral time period and the carbon emission information in combination with a set carbon volume calculation model.

4. The certification system according to claim 3, wherein the carbon emission information comprises at least an emission source type, emission source activity data and carbon reduction solution information, the emission source type and the emission source activity data are determined based on the carbon neutral range and the carbon neutral time period, and wherein the one or more programs, when executed by the one or more processors, cause the one or more processors to, in a case that a carbon reduction solution is implemented after the carbon emission information is acquired:

acquire a carbon emission factor and the carbon volume calculation model based on the emission source type;

determine a carbon emission volume of the carbon neutral entity based on the carbon emission factor, the carbon volume calculation model and the emission source activity data;

determine a carbon reduction volume of the carbon neutral entity based on the carbon reduction solution information of the carbon neutral entity; and subtract the carbon reduction volume from the carbon emission volume to obtain the carbon emission data of the carbon neutral entity.

5. The certification system according to claim 4, wherein the one or more programs, when executed by the one or more processors, cause the one or more processors to, in a case that the carbon reduction solution is implemented before the carbon emission information is acquired:

acquire the carbon emission factor and the carbon volume calculation model based on the emission source type; and determine the carbon emission data of the carbon neutral entity based on the carbon emission factor, the carbon volume calculation model and the emission source activity data.

6. The certification system according to claim 1, wherein the one or more programs, when executed by the one or more processors, cause the one or more processors to:

determine a residual carbon emission offset mode based on the carbon emission data of the carbon neutral entity, and determine an offset volume in the residual carbon emission offset mode based on the residual carbon emission offset mode;

perform carbon offset based on the residual carbon emission offset mode and the offset volume; and generate the offset information.

7. The certification system according to claim 1, wherein the one or more programs, when executed by the one or more processors, cause the one or more processors to:

perform preliminary examination on the self-checked certification declaration information, carbon emission data, activity information and offset information based on the carbon neutral certification standard; and visually display the certification declaration information, the carbon emission data, the activity information and the offset information to a certification authority in response to a positive preliminary examination result, receive a confirmation operation by the certification authority, determine that the certification result of the carbon neutral entity is positive in a case that the confirmation operation indicates success, and generate carbon neutral certification failure prompt information of the carbon neutral entity in a case that the confirmation operation indicates failure.

8. A certification method for carbon neutrality, performed by the certification system according to claim 1, and comprising:

determining the carbon emission data of the carbon neutral entity based on the certification declaration information of the carbon neutral entity, and collecting the activity information of the carbon neutral entity by Internet of Things, image recognition or video recognition;

performing the residual carbon emission offset operation based on the carbon emission data of the carbon neutral entity and generating the offset information;

performing the self-checking on the certification declaration information, the carbon emission data, the activity information and the offset information;

determining the certification result of the carbon neutral entity based on the self-checked certification declaration information, carbon emission data, activity information and offset information in combination with the carbon neutral certification standard determining the carbon emission scheme based on the certification result and the case data for certification similar with the carbon neutral entity, and regulating and guiding the production process and/or activity of the carbon neutral entity based on the carbon emission scheme; and storing the data generated by the carbon neutral entity during the carbon neutral certification to share the data.

9. The certification method according to claim 8, wherein the determining the carbon emission data of the carbon neutral entity based on the certification declaration information of the carbon neutral entity and collecting the activity information comprises:

receiving an application operation of the carbon neutral entity for the carbon neutral certification, and determining the certification declaration information of the carbon neutral entity, wherein the certification declaration information comprises at least a certification authority, a carbon neutral range, a carbon neutral time period and a carbon emission information;

determining the activity information based on the carbon neutral range, the carbon neutral time period and the carbon emission information; and determining the carbon emission data of the carbon neutral entity based on the carbon neutral range, the carbon neutral time period and the carbon emission information in combination with a set carbon volume calculation model.

10. The certification method according to claim 8, wherein the performing the residual carbon emission offset operation based on the carbon emission data of the carbon neutral entity and generating the offset information comprises:

determining a residual carbon emission offset mode based on the carbon emission data of the carbon neutral entity, and determining an offset volume in the residual carbon emission offset mode based on the residual carbon emission offset mode;

performing carbon offset based on the residual carbon emission offset mode and the offset volume; and generating the offset information.

11. The certification method according to claim 8, wherein the determining the certification result of the carbon neutral entity based on the self-checked certification declaration information, carbon emission data, activity information and offset information in combination with the carbon neutral certification standard comprises:

performing preliminary examination on the self-checked certification declaration information, carbon emission data, activity information and offset information based on the carbon neutral certification standard; and visually displaying the certification declaration information, the carbon emission data, the activity information and the offset information to a certification authority in response to a positive preliminary examination result, receiving a confirmation operation by the certification authority in response to a positive preliminary examination result, determining that the certification result of the carbon neutral entity is positive in a case that the confirmation operation indicates success, and generating carbon neutral certification failure prompt information of the carbon neutral entity in a case that the confirmation operation indicates failure.

12. A non-transitory computer readable storage medium storing a computer program, wherein the program, when executed by a processor, implements the certification method according to claim 8.

* * * * *